E. G. Lamson,
Wood Auger.
N° 52,056. Patented Jan. 16, 1866.
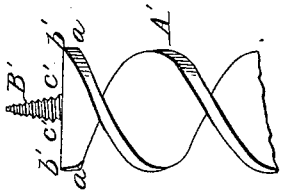
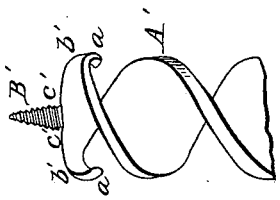
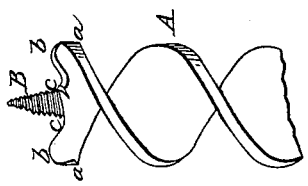
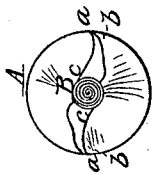
Witnesses.
Frederick Curtis
H. P. Hale Jr.
Inventor:
Ebenezer G. Lamson
by his attorney,
R. H. Eddy

UNITED STATES PATENT OFFICE.

EBENEZER G. LAMSON, OF WINDSOR, VERMONT.

IMPROVEMENT IN AUGERS.

Specification forming part of Letters Patent No. 52,056, dated January 16, 1866.

*To all whom it may concern:*

Be it known that I, EBENEZER G. LAMSON, of the town and county of Windsor, and State of Vermont, have invented a new and useful Improvement in Boring-Bits or Twist-Screw Augers; and I do hereby declare the same to be fully described in the following specification and represented in the accompanying drawings, of which—

Figure 1 is a side elevation, and Fig. 2 an end view, of an auger provided with my improvement.

In the said drawings, A denotes the twisted blade, and B the conical screw, of the auger. The edge-cutters are represented at $a$ $a$ as projecting from the end cutters, $b$ $c$ $b$ $c$.

My improvement consists of a twisted auger as made with the edges of the two end cutters in a concave curve or re-entering angle, and joined with the edge-cutters by convex cutting-curves, the base of the screw B being at the middle or vertex of such curve, the whole being as shown in the drawings.

Heretofore in the construction of twist-screw augers it has been customary to arrange the end cutters either at right angles to the axis, or, in other words, as shown in Fig. 4, or in a convex curve, as represented in Fig. 3, in each of which figures $b'$ $c'$ are the end cutters, B' the screw-point, and A' the twisted blade.

With my improvement the end cutters, when in use, first commence to cut at or near their outer extremities, or at their junctions with the edge-cutters $a$ $a$; but when arranged as exhibited in Fig. 3 the end cutters commence to cut at their inner termini, or at the base of the conical screw B. As arranged as shown in Fig. 4, the end cutters commence to cut throughout their entire lengths. In either of these latter or old arrangements of the cutters, as represented in Figs. 3 and 4, a hole made by the auger in passing through a board will be left ragged or with splinters on the end at which the exit of the auger is made; but with my improved arrangement the cuts of the end cutters are such as to leave a clean terminus of the hole, or one comparatively free from such splinters. Furthermore, my arrangement, as practice has demonstrated, is more favorable than the others for guiding the auger straight in the wood.

I do not claim the improvement patented by Rawson Cook January 17, 1857, and represented in Fig. 3 of the accompanying drawings; nor do I claim the auger as exhibited in Fig. 4 of such drawings.

What I claim as my invention is—

Constructing twisted augers having curved cutting-edges with the base of the tug-screw depressed into the twisted pod beyond the line of the cutting-edges of the floor-lips at their lowest line of cut, substantially as described.

E. G. LAMSON.

Witnesses:
R. H. EDDY,
F. P. HALE, Jr.